US006053299A

United States Patent [19]

[11] Patent Number: 6,053,299
[45] Date of Patent: Apr. 25, 2000

Rollins

[54] APPARATUS AND METHOD FOR PROCESSING COINS IN A HOST MACHINE

[75] Inventor: Ronald W. Rollins, Bensenville, Ill.

[73] Assignee: Money Controls, Inc., Las Vegas, Nev.

[21] Appl. No.: 09/292,462

[22] Filed: Apr. 15, 1999

[51] Int. Cl.[7] .............................. G07C 3/00; G07F 3/02; G06F 7/00

[52] U.S. Cl. .......................... 194/200; 194/202; 194/217; 340/825.35

[58] Field of Search .................................... 194/200, 202, 194/217, 218; 340/825.35

[56] References Cited

U.S. PATENT DOCUMENTS

| | | | |
|---|---|---|---|
| 3,815,717 | 6/1974 | Arseneau . | |
| 3,971,464 | 7/1976 | Seversen . | |
| 4,108,296 | 8/1978 | Hayashi et al. . | |
| 4,109,774 | 8/1978 | Hayashi . | |
| 4,499,985 | 2/1985 | Schuller | 194/218 |
| 4,625,851 | 12/1986 | Johnson et al. | 194/200 |
| 4,741,427 | 5/1988 | Choderker et al. . | |
| 4,754,862 | 7/1988 | Rawicz-Szczerbo et al. . | |
| 4,903,282 | 2/1990 | Botker . | |
| 5,050,719 | 9/1991 | Shimizu . | |
| 5,070,518 | 12/1991 | Botker . | |
| 5,158,166 | 10/1992 | Barson . | |
| 5,180,046 | 1/1993 | Hutton et al. . | |
| 5,219,059 | 6/1993 | Furuya et al. | 194/200 |
| 5,366,058 | 11/1994 | Kurosu | 194/202 |
| 5,377,807 | 1/1995 | Kojima et al. . | |
| 5,379,876 | 1/1995 | Hutton . | |
| 5,433,309 | 7/1995 | Yellop et al. . | |
| 5,469,952 | 11/1995 | Kershaw et al. . | |
| 5,489,015 | 2/1996 | Wood . | |
| 5,515,960 | 5/1996 | Wood . | |
| 5,657,847 | 8/1997 | Tod et al. . | |
| 5,836,818 | 11/1998 | Jones et al. . | |

FOREIGN PATENT DOCUMENTS

| | | |
|---|---|---|
| 3500855 A1 | 7/1986 | Germany . |
| 2 169 429A | 7/1986 | United Kingdom . |

*Primary Examiner*—Dean J. Kramer
*Assistant Examiner*—Bryan Jaketic
*Attorney, Agent, or Firm*—Morgan & Finnegan

[57] ABSTRACT

Apparatus and method for processing coins in a host machine including a coin validator, a switch and a processor. Coin validation and coin credit to a host machine are effectuated by generating an opto-emulation sequence. The occurrence of coins being stolen is minimized by an application of a temporary inhibit signal when the system determines that parity between the number of valid advance credit signals and a predetermined maximum setting is reached.

29 Claims, 5 Drawing Sheets

APPARATUS AND METHOD FOR PROCESSING COINS IN A HOST MACHINE

FIELD OF THE INVENTION

The present invention relates generally to a coin discrimination apparatus, and more specifically to a coin acceptor used by a host machine such as a vending machine or slot machine.

BACKGROUND OF THE INVENTION

Many host machines such as vending machines and slot machines perform various functions such as validating a coin (or token), issuing coin credit, counting the number of inserted coins, detecting a fraud condition, etc. These functions are often performed by the use of optics technology. Because optical equipment in a host machine can be expensive and unreliable, the ability to eliminate or reduce such optics is desired.

Operation of a host machine often requires, as a prerequisite, that coins be deposited into a coin acceptor. In typical machines, the coin acceptor and host machine are in communication with each other such that performance of the host machine is affected by integrating signals generated by both the coin acceptor and host optics. Operation of the coin acceptor is affected by the power supplied and signals communicated by the host machine.

In certain applications, the coin acceptor is disabled when power to the coin acceptor is cut off by the host machine. For example, power may be cut off when a predetermined event occurs, such as reaching a coin maximum. Accordingly, with certain coin acceptors, a coin may be accepted by the coin acceptor, but power is not available to issue a required credit signal thereby causing the accepted coin to be retained by the host machine but not credited, or "stolen." This typically arises when one or more coins are deposited into the coin acceptor shortly after the coin acceptor is disabled by the host machine.

SUMMARY OF THE INVENTION

It is therefore desirable to improve the reliability of vending machines that utilize host optics by obviating the need for such optics while minimizing the "stealing" of coins by the machine. The present invention provides a method and system for processing coins in a host machine which minimizes the "stealing" of coins by the machine.

The apparatus includes a coin validator which determines whether a deposited coin is valid, invalid and/or jammed and generates a valid advance credit signal (VACS) if the coin has been determined to be valid. The apparatus includes a switch which sets a predetermined coin maximum setting. The apparatus further includes a processor which counts the number of valid advance credit signals and generates and applies a temporary inhibit signal to a coin acceptor when the valid advance credit count reaches a predetermined maximum setting.

According to another aspect of the invention, the apparatus includes a coin limit detector which counts the number of valid advance credit signals generated by a coin validator. A processor compares the predetermined maximum setting to the number of valid advance credit signals generated. In one embodiment, the processor further generates a temporary inhibit signal when parity between the number of valid advance credit signals and the predetermined maximum setting is reached. Parity is reached when the number of VACS signals counted by the processor is equal to or greater than the predetermined maximum coin setting of the switch. When parity is reached, the processor also generates at least one opto-emulation signal to a host machine. An opto-emulation signal is a signal or sequence of signals generated by the processor and provides instructions to the host machine as to existence of an accept, fraud or jam condition. The opto-emulation signals are transmitted to the host machine, thereby emulating and replacing a signal sequence to the host machine when a coin is accepted.

According to another aspect of the invention, there is provided a method of processing a coin comprising the steps of receiving the coin, determining whether the coin is valid or invalid, determining whether a fraud condition or jam condition exists, generating a valid advance credit signal if the coin has been determined to be valid and no fraud or jam condition is detected, counting each valid advance credit signal generated and comparing a predetermined maximum setting to the number of valid advance credit signals generated. An inhibit signal is applied to the coin acceptor when parity between the number of valid advance credit signals and the predetermined maximum setting is reached. A status signal or sequence of status signals is also generated and transmitted to the host machine, the status signal being representative of whether a jam condition, fraud condition or acceptable coin travel is detected.

DETAILED DESCRIPTION

Figure 1:
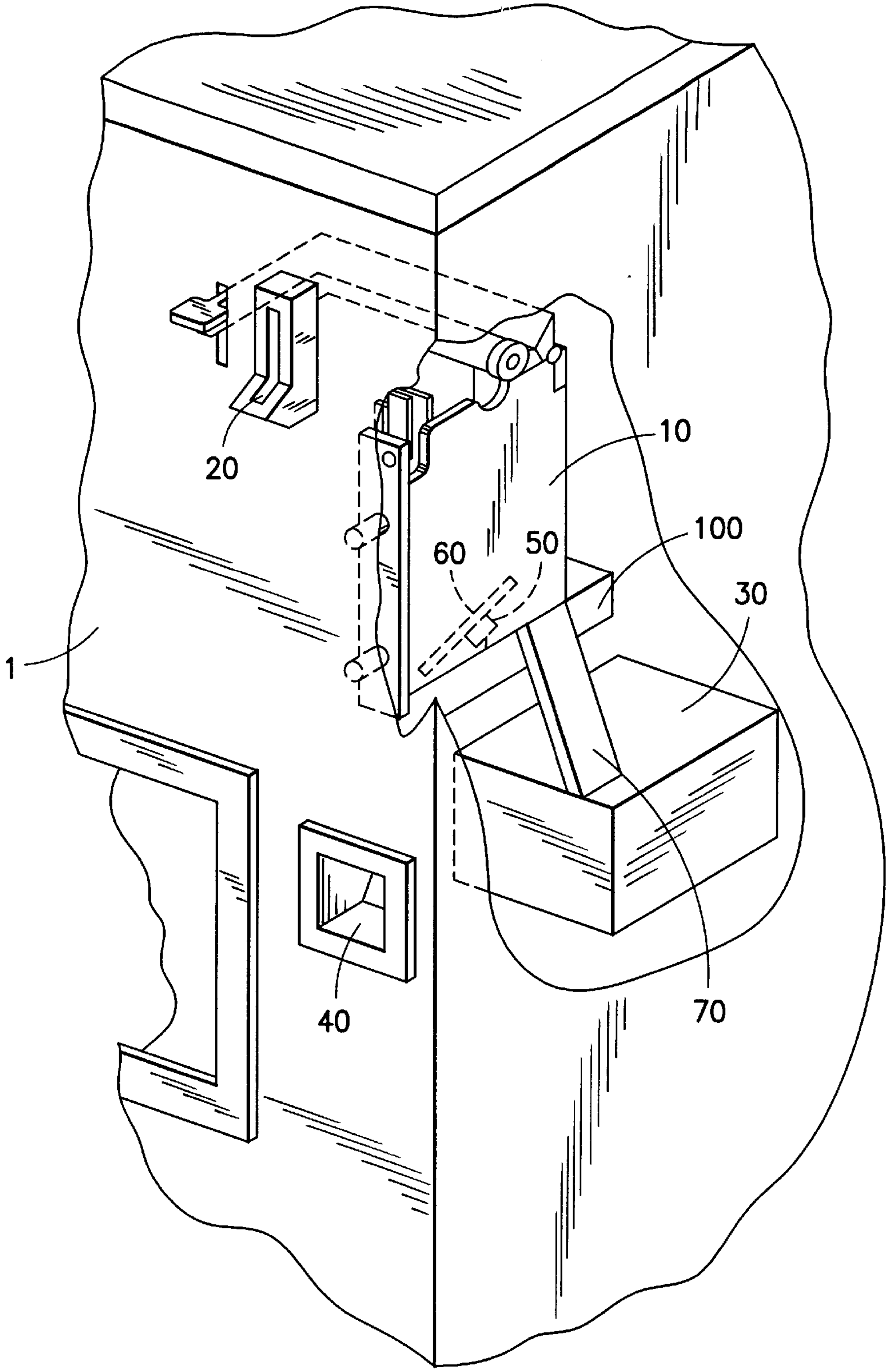
FIG. 1 is a perspective view of a portion of a host machine containing a coin acceptor having an opto-emulation module according to one embodiment of the present invention.

FIG. 1 shows host machine 1 embodying a coin acceptor 10 an accumulator 30 and an opto-emulation module 100 in accordance with one embodiment of the present invention. Although coin acceptor 10, accumulator 30 and opto-emulation module 100 are typically housed in host machine 1, these components may be physically attached or otherwise connected to host machine 1. In the alternative, these components may be disposed remotely from host machine 1.

Coin slot 20 is located on the external front surface of host machine 1. When deposited into coin slot 20, a coin travels through coin acceptor 10 and proceeds to solenoid operated gate 60. Coin acceptor 10 may be a CM133 (Condor) coin acceptor manufactured by Coin Controls International. Depending on the coin's validity, whether a fraud or jam condition is detected and whether a coin maximum event has been met, the coin may be accepted or rejected by host machine 1. If the coin is accepted, accept gate 60 is opened by charging solenoid 50 enabling the coin to pass along accept path 70 and to be delivered to accumulator 30. Alternatively, if the coin is rejected, gate 60 remains closed and the coin is diverted to reject chute 40. Whether the gate is charged is controlled by the output signals 122 generated by opto-emulation module processor (OEM processor) 120 of opto-emulation module 100 to solenoid 50 as discussed below.

Figure 2:
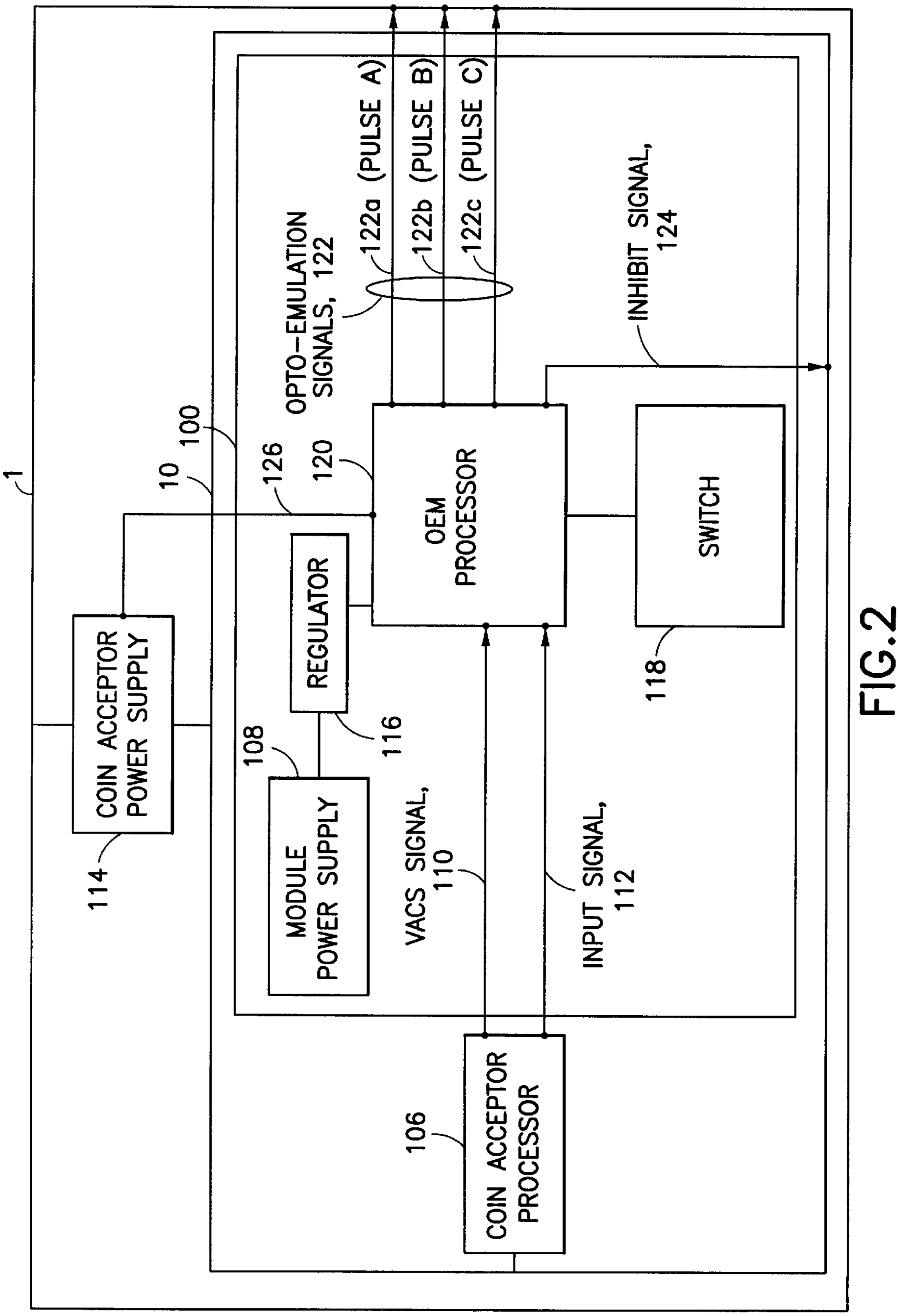
FIG. 2 is a schematic of a coin acceptor and opto-emulation module according to one embodiment of the present invention.

FIG. 2 shows opto-emulation module 100 electrically connected to host machine 1 and coin acceptor 10. Opto-emulation module 100 comprises a module power supply 108, a switch 118, a regulator 116 and OEM processor 120. Coin acceptor 10 determines whether the coin is valid, and if so, processor 106 of coin acceptor 10 generates pre-acceptance valid advance credit signal (VACS) 110. It is to be understood that VACS signal 110 may be generated by a processor or other circuitry (e.g., ASIC or discrete logic) in coin acceptor 10. In one embodiment, VACS signal 110 is a 24 volt signal generated by a processor 106 of coin acceptor 10. The 24 volt output is coupled (e.g., optically)to opto-emulation module 100 and is stepped down to 5 volts inputted to OEM processor 120 of opto-emulation module 100. Processor 106 of coin acceptor 10 communicates the 5 volt VACS signal 110 to OEM processor 120 of the opto-emulation module each time a coin is inserted into coin acceptor 10 and the coin is determined to be valid.

OEM processor 120 may be a PIC16C55 microcontroller manufactured by Microchip Devices, which, as described more fully herein, implements all algorithms to control VACS signal 110, input signal (credit or alarm) 112, opto-emulation signals 122 (i.e., pulse A 122*a*, pulse B 122*b*, pulse C 122*c*), and inhibit signal 124. Power for OEM processor 120 may be supplied by an 11-volt DC conventional power supply 108 connected to the input of a 5-volt regulator 116, the output of which supplies operating voltage for OEM processor 120, and supplies operating voltage to switch 118.

Power may be supplied to coin acceptor 10 by a 24-volt AC conventional power supply 114 and a connection cable 126. In one embodiment of the present invention, the connection cable may be a seven way connector manufactured by Molex Incorporated.

Processor 106 of coin acceptor 10 also generates input (credit or alarm) signal 112. Input signal 112 may be generated by processor 106 or other circuitry (e.g., ASIC or discrete logic) in coin acceptor 10. Input signal 112 is a 24 volt signal generated by the processor of coin acceptor 10. The 24 volt output is coupled (e.g., optically) to opto-emulation module 100 and is stepped down to 5 volts inputted to OEM processor 120 of opto-emulation module 100. When a valid coin is detected by coin acceptor 10, the 5 volt input signal 112 is a credit signal which is generated by processor 106 in coin acceptor 10. If, however, a fraud condition results (i.e., tampering with host machine 1 and/or coin acceptor 10), an alarm signal is generated by processor 106 of coin acceptor 10. The credit and alarm signals may be applied for 12 milliseconds and 17 milliseconds, respectively.

In one embodiment of the present invention, processor 120 reads VACS signal 110 and input (credit or alarm) signal 112. After reading signals 110 and 112, the processor logic controls the output of opto-emulation signals 122. Output signals 122 generated by opto-emulation module 100 are identified in timing charts 200*a*, 200*b* and 200*c* of FIGS. 3(*a*), 3(*b*) and 3(*c*), respectively, and are discussed in greater detail below. OEM processor 120 also counts each VACS signal 110 generated by coin acceptor 10. OEM processor 120 further controls the application of a temporary inhibit signal 124 to coin acceptor 10 when the VACS signal count reaches a predetermined limit.

In one embodiment of the present invention, switch 118 may be a six way dual in line (DIL) switch. Switch 118 may use, for example, binary and/or hexadecimal counting modes. OEM processor 120 is set to count a predetermined number of coins inserted into coin acceptor 10. The predetermined setting is established by switch 118. The predetermined setting may be any natural number limited by the capacity of the DIL switch (i.e., six way DIL switch 118 permits processor 120 to count up to six VACS signals 110). Alternatively, an unlimited setting may be designated by setting two or more switches to an on position or by setting all of the switches to an off position.

Figure 3A:
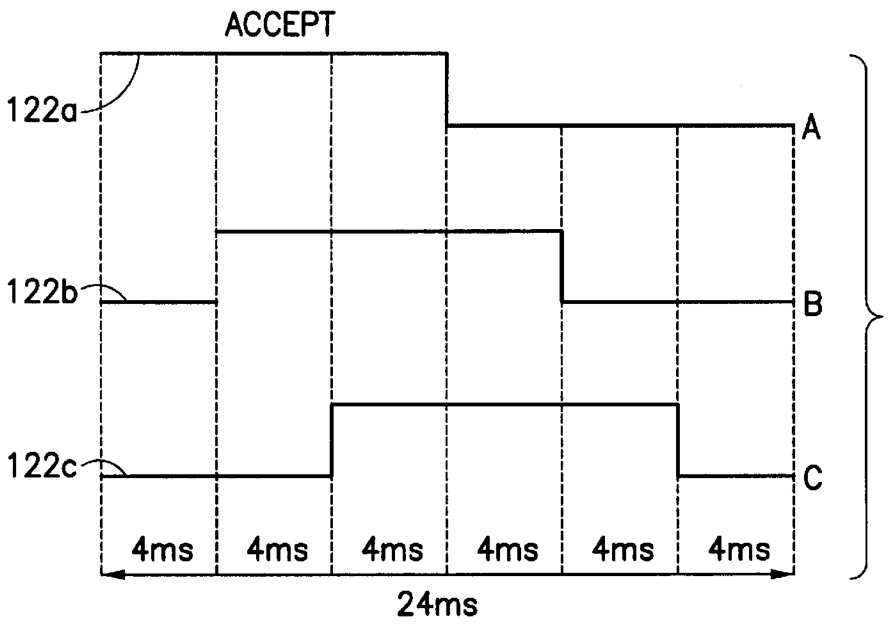
FIGS. 3(*a*), 3(*b*) and 3(*c*) are timing charts of the output signals generated by the opto-emulation module of FIGS. 1 and 2.
Figure 3B:
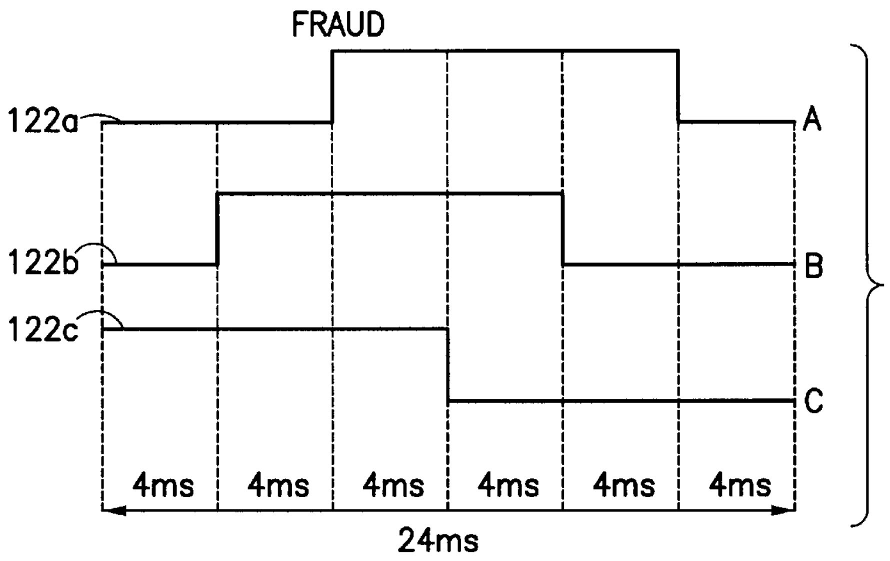
Figure 3C:
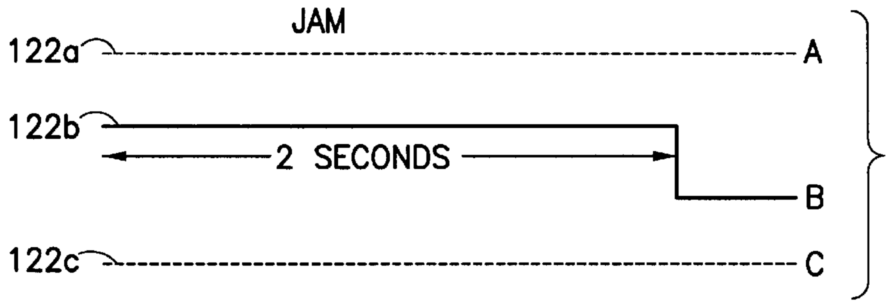

To enable host machine 1 to read credit or alarm input signal 112, the opto-emulation module 100 generates three pulses A, B and C illustrated in FIGS. 3(*a*)–3(*c*) as 122*a*, 122*b* and 122*c*, respectively. FIGS. 3(*a*), 3(*b*) and 3(*c*) illustrate the timing sequences generated by opto-emulation module 100 of FIG. 2. As FIG. 3(*a*) illustrates, for all accepted coins the sequence generated is as follows: (1) A; (2) A+B; (3) A+B+C; (4) B+C; (5) C. FIG. 3(*b*) illustrates the sequence generated for all fraud conditions. The sequence is: (1) C; (2) B+C; (3) A+B+C; (4) A+B; (5) A. The complete sequence for the accept signal of FIG. 3(*a*) and the fraud signal of FIG. 3(*b*) in one embodiment of the invention is approximately 24 milliseconds. The sequence for a coin jam is illustrated in FIG. 3(*c*) and is a two second pulse of signal B 122*b* generated by processor 120.

Each time a valid coin is received by coin acceptor 10 and power to the coin acceptor is not disabled by host machine 1, opto-emulation signals 122 are generated by opto-emulation module 100 resulting in a fraud, accept or jam signal communicated to host machine 1. If coin acceptor 10 is tampered with (i.e., attempting to operate host machine 1 while intentionally bypassing the coin acceptor), a fraud signal is generated. A jam signal is generated when the acceptor senses that the received coin is either trapped in the path of coin acceptor 10 or the coin's travel is otherwise obstructed. A coin may become trapped or obstructed when multiple coins are rapidly inserted, shock is applied to host machine 1 or some other event causes an irregular coin travel. If, however, the received coin is valid, its travel is not obstructed, no fraud condition exists and power to coin acceptor 10 is not disabled, an accept signal is generated to host machine 1. Additionally, as discussed below, upon detection of a predetermined number of VACS signals 110, OEM processor 120 generates inhibit signal 124, thereby temporarily inhibiting coin acceptor 10 from accepting additional coins. Although temporary inhibit signal 124 in one embodiment of the present invention is applied by OEM processor 120 for a duration between approximately 500 milliseconds and one second, the application time of such inhibit may be varied. Temporary inhibit signal 124 prevents solenoid 50 of coin acceptor 10 (FIG. 1) from being charged. Accordingly, accept gate 60 is not opened and the coin is diverted to reject chute 40.

Figures 4, 4A:
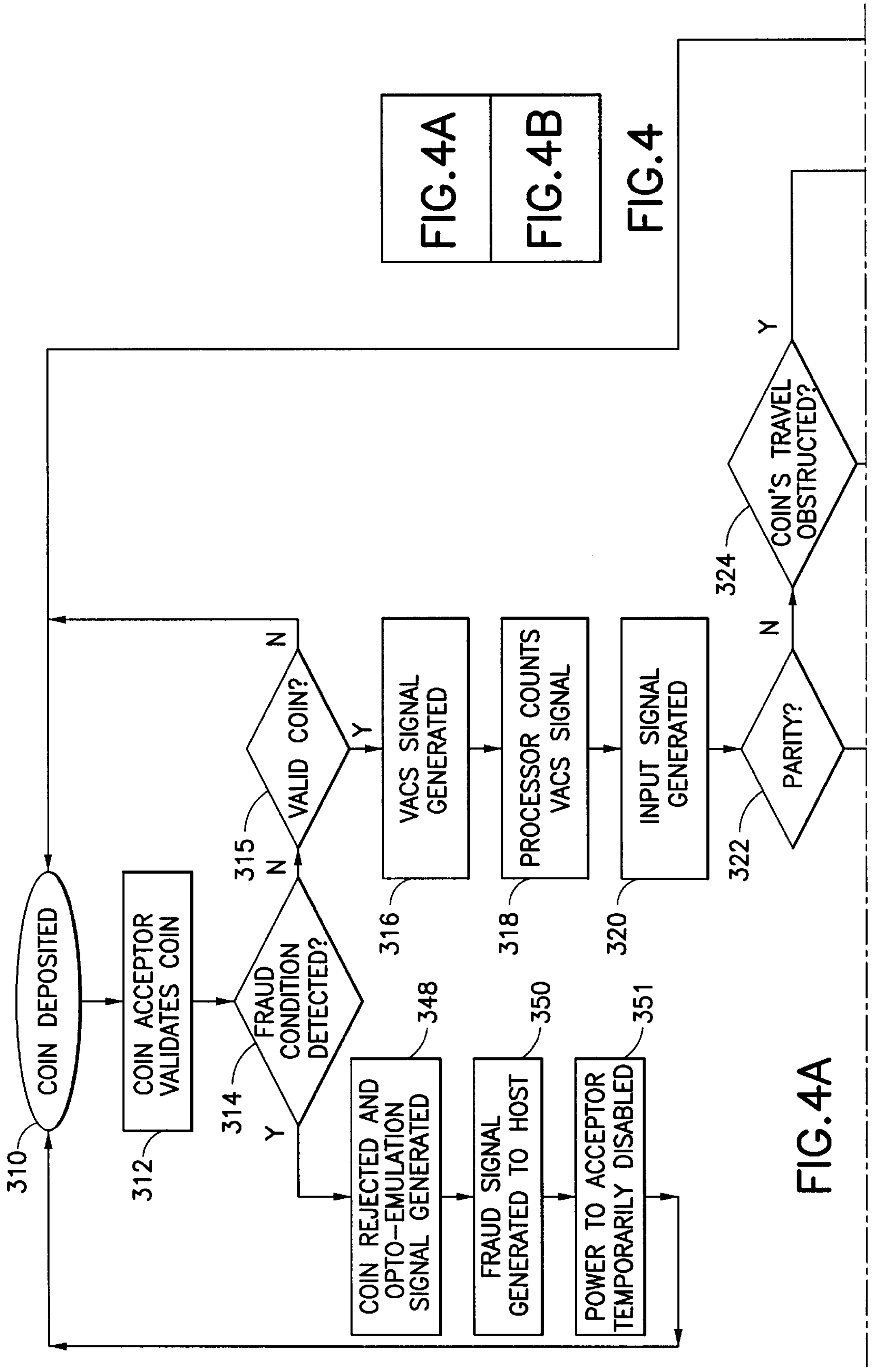
FIG. 4 is a flow chart of a method for receiving coins employing opto-emulation according to an embodiment of the present invention.
Figure 4B:
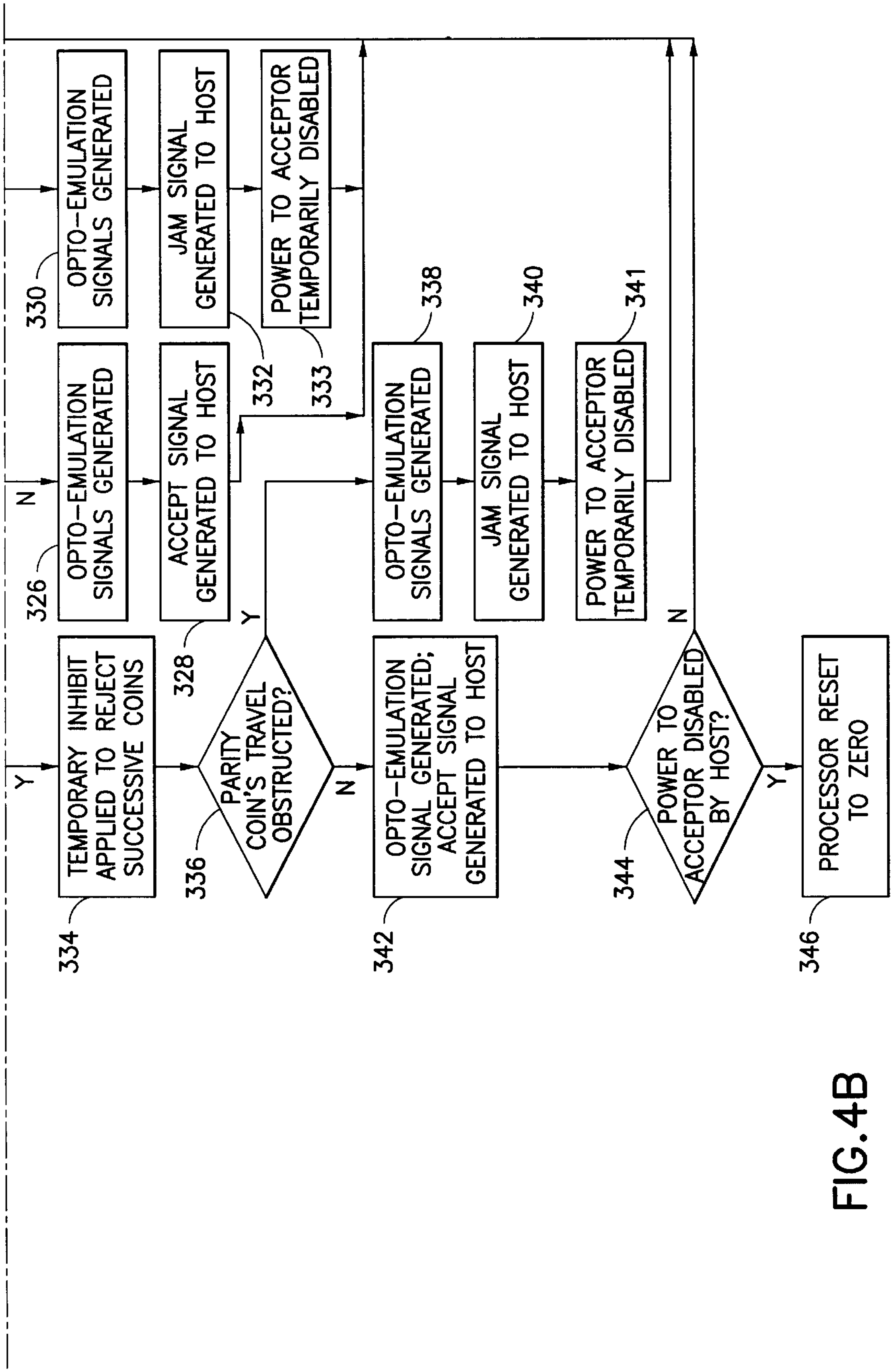

Referring now to FIG. 4, there is illustrated a block flow chart of a method employing opto-emulation module 100 illustrated in FIG. 2. In step 310, a coin is deposited into coin slot 20 and travels into coin acceptor 10. After its deposition, the coin is validated in step 312. In steps 314 and 315, coin acceptor 10 determines how the coin is processed depending on whether the coin is valid and whether a fraud condition is detected. If a fraud condition is detected, OEM processor 120 generates opto-emulation signals 122 to host machine 1 and the coin is rejected (step 348). Because a fraud condition is detected, fraud output sequence 200*b* as illustrated in FIG. 3(*b*) is generated (step 350). As a result of the fraud condition, power to coin acceptor 10 is temporarily disabled by host machine 1 (step 351). Although any previous credits are maintained by host machine 1, opto-emulation module 100 is reset and power to coin acceptor 10 remains disabled until the fraud condition is rectified (i.e., by an attendant). Once power is restored to coin acceptor 10, the deposition of an additional coin is prompted by host machine 1(step 310). If no fraud condition is detected in step 314 and the inserted coin is invalid, the coin is rejected and the deposition of an additional coin is prompted (step 310). If, however, the coin is valid and no fraud condition is detected, opto-emulation module 100 generates VACS signal 110 in step 316. As discussed previously, VACS signal 110 is a pre-acceptance valid advance credit signal and is generated each time a coin is deposited into coin acceptor 10 and determined to be valid. In step 318, OEM processor 120 of opto-emulation module 100 counts each generated VACS signal 110. In addition to generating VACS signal 110, processor 106 of coin acceptor 10 generates input signals 112 in step 320. As discussed earlier, input signals 112 may be an alarm signal or credit signal depending on the coin's validity, its travel through coin acceptor 10 and whether a fraud condition exists.

In step 322, OEM processor 120 determines whether the coin deposited is a parity coin by comparing the number of VACS signals 110 counted by OEM processor 120 to the predetermined maximum setting set by switch 118. Parity is reached when the number of VACS signals 110 counted by OEM processor 120 is equal to or greater than the predetermined maximum coin setting of switch 118. Accordingly, a coin is considered a parity coin when the coin inserted into coin acceptor 10 is valid and the number of VACS signals counted by processor 120 is equal to or greater than the number of the predetermined maximum coin setting pursuant to switch 118.

If parity has not been met, OEM processor 120 detects whether the coin's travel through coin acceptor 10 has been obstructed by receiving input signal 112 from processor 106 of coin acceptor 10 (step 234). If the coin's travel through coin acceptor 10 is not obstructed, opto-emulation signals 122 are generated in step 326 resulting in an accept output sequence (step 328), as illustrated in sequence 200*a* of FIG. 3(*a*), and a coin credit is recognized by host machine 1. If the coin's travel is obstructed, OEM processor 120 generates opto-emulation signals 122 (step 330) resulting in a jam output sequence (step 332), as illustrated in sequence 200*c*, and coin credit is not recognized by host machine 1. As a result of the jam condition, power to coin acceptor 10 is temporarily disabled by host machine 1 (step 333). Although any previous credits are maintained by host machine 1, opto-emulation module 100 is reset and power to coin acceptor 10 remains disabled until the jam condition is rectified (i.e., by an attendant). Once power is restored to coin acceptor 10, the receipt of additional coins is prompted in step 310.

Returning to step 322, if the coin received by coin acceptor 10 is a parity coin, then OEM processor 120 applies temporary inhibit signal 124 to coin acceptor 10 (step 334). Although temporary inhibit 124 in one embodiment of the present invention is applied for approximately 500 milliseconds, the time of such inhibit may be varied.

In step 336, OEM processor 120 determines whether the travel of the parity coin has been obstructed by receiving input signal 112 from processor 106 of coin acceptor 10. If the coin's travel is obstructed, opto-emulation module 100 generates opto-emulation signals 122 (step 338)resulting in a jam output sequence(step 340) as illustrated in sequence 200*c* (FIG. 3(*c*)). As a result of the jam condition, power to coin acceptor 10 is temporarily disabled by host machine 1 (step 341). Although any previous credits are maintained by host machine 1, opto-emulution module 100 is reset and power to coin acceptor 10 remains disabled until the jam condition is rectified (i.e., by an attendant). Once power is restored to coin acceptor 10, the deposition of an additional coin is prompted by host machine 1(step 310). If, however, the coin travels through coin acceptor 10 without interruption, opto-emulation signals 122 are generated by opto-emulation module 100 resulting in a coin credit recognized by host machine 1 in step 342.

In step 344, OEM processor 120 detects, via connector 126, whether host machine 1 has disabled power to coin acceptor 10. Power is disabled by host machine 1 when the number of accept sequences 200*a* received by host machine 1 is equal to the predetermined maximum set by switch 118. If OEM processor 120 does not detect that power to coin acceptor 10 is disabled by host machine 1, host machine 1 prompts the insertion of an additional coin (step 310). If, however, the number of accept sequences 122*a* generated by opto-emulation module 100 is equal to the predetermined maximum setting of switch 118, and, therefore, power to coin acceptor 10 is disabled by host machine 1, OEM processor 120 is reset to zero throughout the completion of the vending cycle.

Alternative embodiments of the present invention are possible. For example, this description uses a six way dual in line switch, but any means for setting the number of events to be counted may be utilized. The description also refers to a processor manufactured by Microchip Devices, model number PIC16C55, but any means for receiving signals and implementing the algorithms to effectuate the described opto-emulation is an equivalent. Further, the description identifies credit, alarm, VACS, opto-emulation and inhibit signals, however any means for effectuating the described inhibit and opto-emulation sequences is an equivalent. The description of one embodiment of the present invention also identifies the application of a temporary inhibit for approximately 500 milliseconds, but a lesser or greater duration is understood to be an equivalent. The description also describes the pulses required to generate accept, fraud and jam signals, however other pulse sequences may permit such signals. The description further explains opto-emulation module 100 is reset when a fraud or jam condition occurs. In an alternative embodiment, opto-emulation module 100 may maintain any previous credits when such conditions result.

The foregoing is to be understood as being in every respect illustrative and exemplary, but not restrictive, and the scope of the invention disclosed herein is not to be determined from the Detailed Description, but rather from the claims as interpreted according to the full breadth permitted by law. It is to be understood that the embodiments shown and described herein are only illustrative of the principles of the present invention and that various modifications may be implemented by those skilled in the art without departing from the scope and spirit of the invention.

I claim:

1. A method for processing coins comprising the steps of:

receiving at least one coin in a housing;

determining whether the coin is valid, invalid, jammed and/or whether a fraud condition is detected;

generating a valid advance credit signal if the coin has been determined to be valid;

counting each valid advance credit signal;

comparing a predetermined maximum setting to a number totaling each valid advance credit signal generated;

generating a status signal for transmission to a host machine, the status signal being representative of whether the coin is valid, invalid, jammed and/or whether a fraud condition is detected; and generating a temporary inhibit signal to a coin acceptor when the number totaling each valid advance credit signal reaches the predetermined maximum setting.

2. The method of claim 1, wherein the temporary inhibit signal is transmitted to the coin acceptor before the status signal is transmitted to the host machine.

3. The method according to claim 2, further comprising the steps of retaining coins which are determined to be valid and rejecting coins which are determined to be invalid.

4. The method according to claim 3, further comprising the steps of generating and transmitting a signal from the host machine to the coin acceptor, resulting in the disabling of power to the coin acceptor throughout a vend cycle, when a second number totaling each coin retained by an accumulator of the host machine is equal to the predetermined maximum setting.

5. The method according to claim 4, further comprising the step of resetting to zero the count of each valid advance credit signal generated when the second number is equal to the predetermined maximum setting and power to the coin acceptor is disabled.

6. The method according to claim 5, further comprising the step of rejecting an inserted coin during the transmission of the temporary inhibit signal or the disabling of power to the coin acceptor.

7. The method according to claim 4, further comprising the step of resetting to zero the count of the valid advance credit signals when the number totaling each coin retained by the accumulator of the host machine is equal to the predetermined maximum setting.

8. The method according to claim 1, further comprising the step of rejecting a coin while the temporary inhibit signal is applied.

9. A coin processing apparatus comprising:

a housing for receiving a coin;

a coin validator configured to determine whether the coin is valid, invalid, jammed and/or whether a fraud condition is detected, and to generate a valid advance credit signal if the coin has been determined to be valid;

a switch configured to set a predetermined maximum coin setting; and a processor configured to count the number of the valid advance credit signals, to compare the number of valid advance credit signals to the predetermined maximum setting, to generate a temporary inhibit signal to a coin acceptor when the valid advance credit count reaches the predetermined maximum coin setting, and to generate a status signal to a host machine.

10. The apparatus of claim 9, wherein the processor generates status signals resulting in the communication of pulses which emulate and replace a signal sequence of a host machine in response to the coin deposited into the housing.

11. The apparatus according to claim 10, wherein the processor is configured to generate and transmit accept sequence pulses, fraud sequence pulses and jam sequence pulses to the host machine.

12. The apparatus according to claim 11, wherein the number of valid advance credit signals counted by the processor is reset to zero when a second number totaling each coin retained by an accumulator of the host machine is equal to the predetermined maximum setting.

13. The apparatus according to claim 12, further comprising a power supply which provides operating voltage for the processor and switch.

14. The apparatus according to claim 13, wherein the switch is a dual in line switch.

15. The apparatus according to claim 14, wherein the accept sequence pulses have a duration of approximately twenty-four milliseconds.

16. The apparatus according to claim 14, wherein the fraud sequence pulses have a duration of approximately twenty-four milliseconds.

17. The apparatus according to claim 14, wherein the jam sequence pulses have a duration of approximately two seconds.

18. The apparatus according to claim 9, wherein the switch provides a setting for acceptance of an unlimited number of coins.

19. The apparatus according to claim 14, wherein power to the coin acceptor is disabled through completion of a vend cycle when a second number totaling each coin retained by an accumulator of the host machine is equal to the prede termined maximum setting.

20. The apparatus according to claim 19, wherein the apparatus is housed in a coin acceptor.

21. The apparatus according to claim 20, wherein the coin acceptor is housed in the host machine.

22. An opto-emulation module which controls a coin acceptor of a host machine and is in communication with the host machine, the module comprising:

a housing for receiving a coin;

a coin validator configured to determine whether the coin is valid, invalid, jammed and/or whether a fraud condition is detected, and to generate a valid advance credit signal if the coin has been determined to be valid;

a switch configured to set a predetermined maximum coin setting;

a coin limit detector configured to count a number of valid advance credit signals;

a processor adapted to compare the predetermined maximum setting to the number of valid advance credit signals generated, to generate a temporary inhibit signal when parity between the number of valid advance credit signals and the predetermined maximum setting is reached, and to generate at least one status signal to a host machine resulting in the communication of at least one pulse which emulates and replaces a signal sequence of the host machine when the coin is accepted by the machine.

23. The opto-emulation module according to claim 22, wherein the processor is configured to generate pulses resulting in an accept sequence, fraud sequence and jam sequence.

24. The opto-emulation module according to claim 22, further comprising a power supply which provides operating voltage for the processor and switch.

25. The opto-emulation module according to claim 22, wherein the switch is a dual in line switch.

26. The apparatus according to claim 23, wherein the number of valid advance credit signals counted by the processor is reset to zero when a second number totaling each coin retained by an accumulator of the host machine is equal to the predetermined maximum setting.

27. The apparatus according to claim 26, wherein power to the coin acceptor is disabled through completion of a vend cycle when the second number totaling each coin retained by the accumulator of the host machine is equal to the predetermined maximum setting.

28. A device for processing a coin comprising:

means for receiving at least one coin in a coin acceptor;

means for determining whether the coin is valid, invalid, jammed and/or whether a fraud condition is detected;

means for generating a valid advance credit signal if the coin has been determined to be valid;

means for counting each valid advance credit signal;

means for comparing a predetermined maximum setting to a number totaling each valid advance credit signal generated;

means for generating a status signal for transmission to a host machine, the signal being representative of whether the coin is valid, invalid, jammed and/or whether a fraud condition is detected;

means for generating a temporary inhibit signal when the number totaling each valid advance credit signal reaches the predetermined maximum setting; and means for transmitting the temporary inhibit signal to the coin acceptor before the status signal is transmitted to the host machine.

29. The device according to claim 28, further comprising:

means for retaining the coin where the coin is designated valid or rejecting the coin where the coin is designated invalid;

means for disabling power to the coin acceptor through completion of a vend cycle when a second number totaling each coin retained by an accumulator of the host machine is equal to the predetermined maximum setting;

means for resetting to zero the counting of the valid advance credit signal generated when power to the coin acceptor is disabled; and means for rejecting an inserted coin while the temporary inhibit signal is transmitted or when power to the coin acceptor is disabled.

* * * * *